Nov. 7, 1967  A. FAVA  3,351,023
TRANSPORTING AND STORING DEVICE
Filed Jan. 21, 1965  5 Sheets-Sheet 1

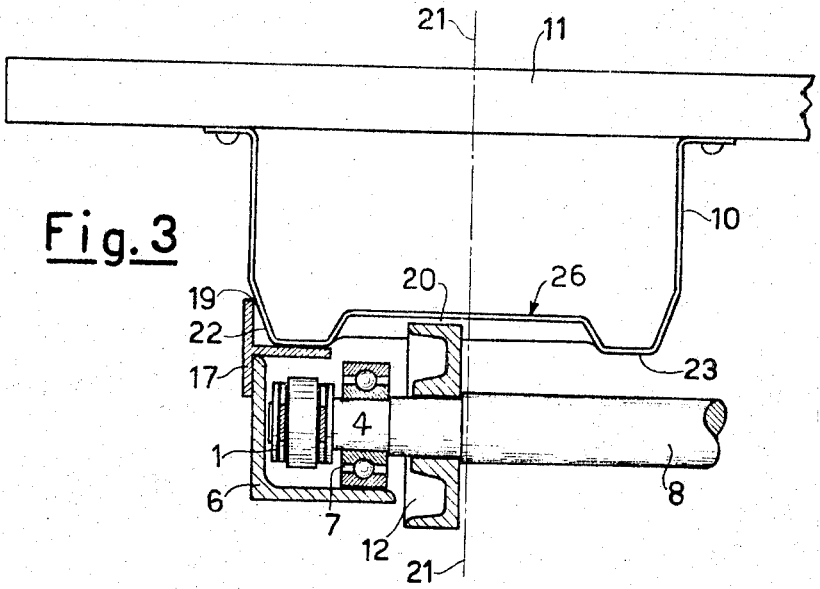
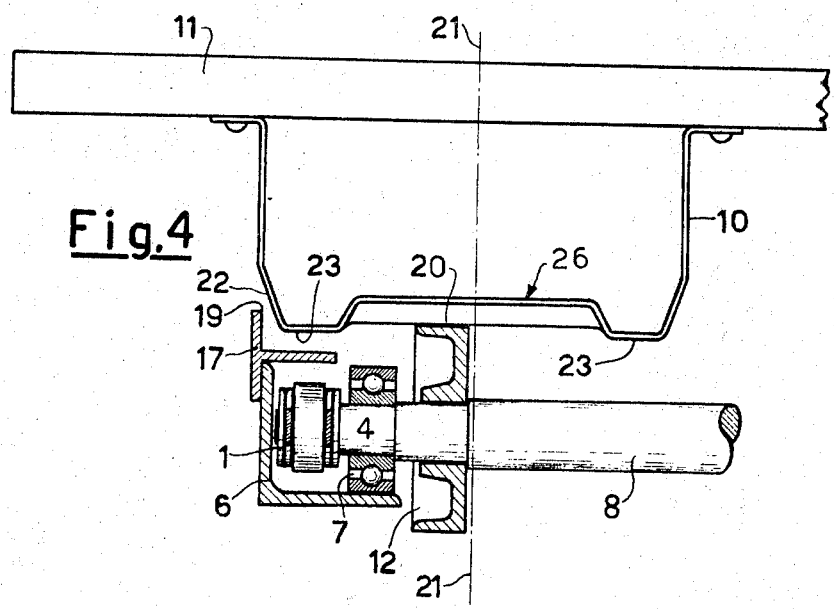

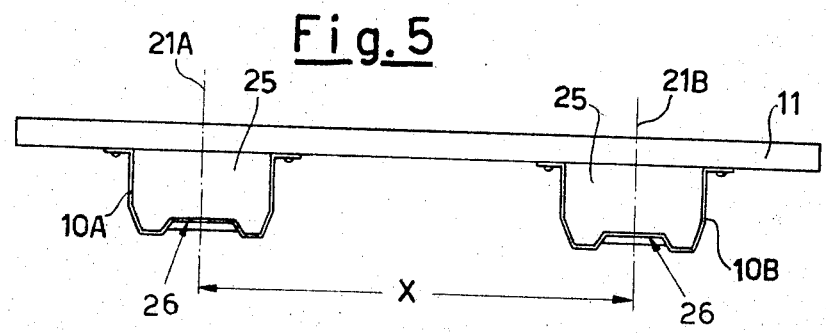
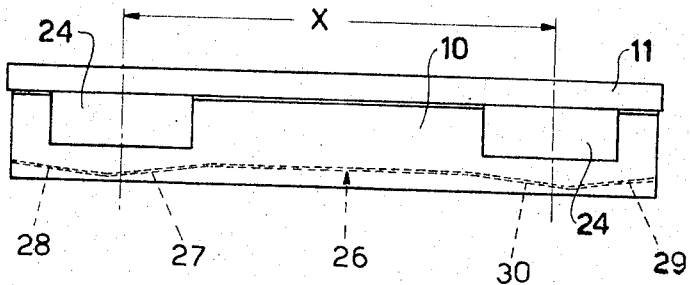

Nov. 7, 1967 A. FAVA 3,351,023
TRANSPORTING AND STORING DEVICE
Filed Jan. 21, 1965 5 Sheets-Sheet 4

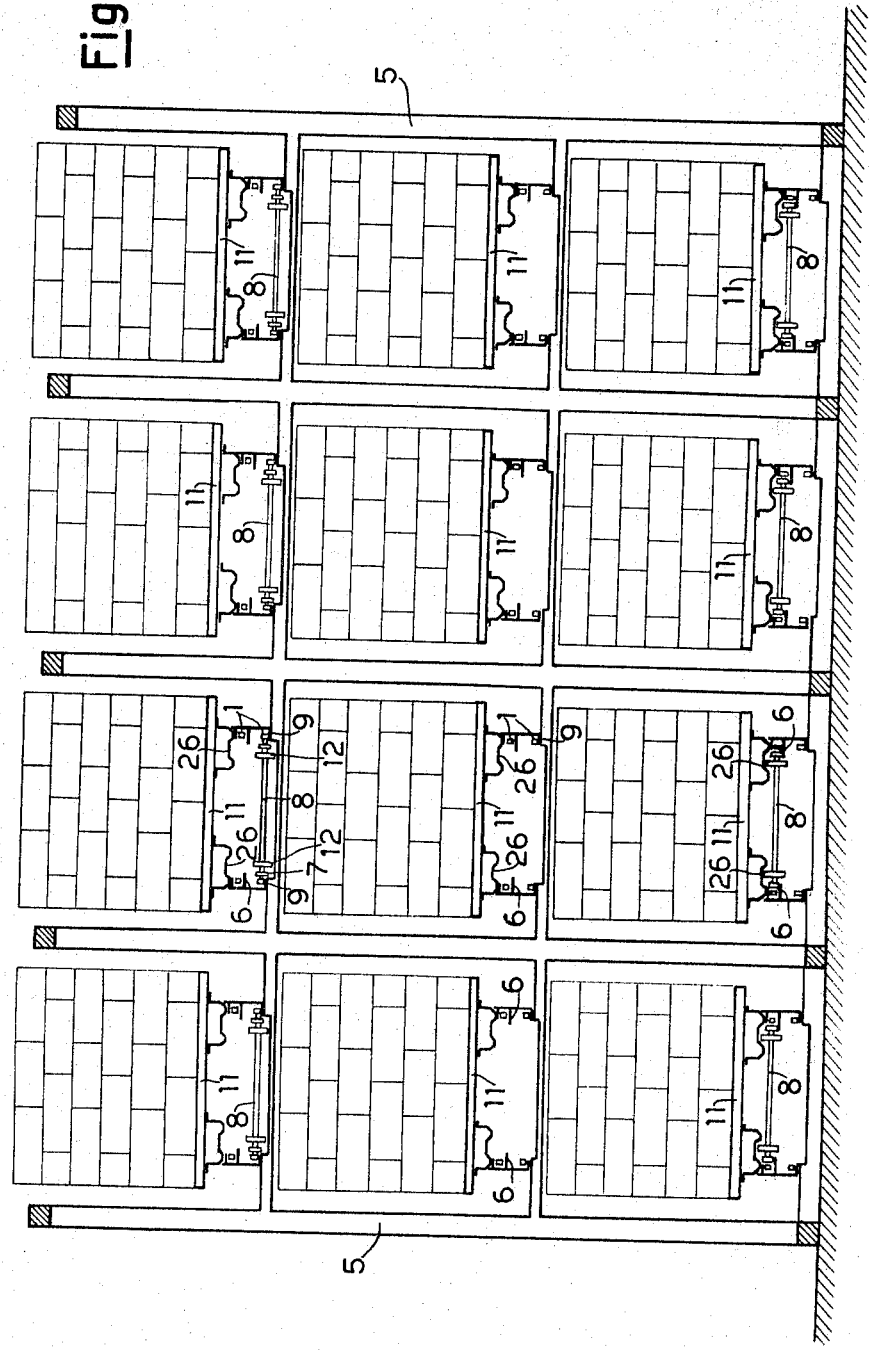

United States Patent Office

3,351,023
Patented Nov. 7, 1967

3,351,023
TRANSPORTING AND STORING DEVICE
Augusto Fava, Milan, Italy, assignor to Essiccatoi Fava
S.p.A., Cento, Italy, a company of Italy
Filed Jan. 21, 1965, Ser. No. 427,044
Claims priority, application Italy, Jan. 25, 1964,
1/448/64, Patent 713,642; Aug. 6, 1964,
50,054/64, Patent 17,111
8 Claims. (Cl. 104—172)

ABSTRACT OF THE DISCLOSURE

A transport and storage device comprising a carriage constituted by two parallel shafts carried by a pair of chains for advancement therewith, two pairs of rollers being mounted on the shafts, one pair for cooperating with a support guide, the other with a foot carried by a platform car to raise and advance the car when its travel is unimpeded by an abutment or a previous stationary car or to lower the car in place if its travel is impeded.

---

The present invention relates to a transporting and storing device for products to be transported on platform cars or the like, to be utilized in storage-rooms wherein the products are to be stored. The products may be of any kind, finished or in work, of equal or different qualities. A particular field is that of foodstuffs, for instance various types of alimentary pastes.

Various systems are in use at present to store products. These systems may be of the kind with which to a determined quality of product there is destined part of the space of premises, within which the production is stored and from which on request, the product that has been stored for the longest duration of time is removed. Such a system has inconveniences of various kinds. Firstly it requires much space to permit access with lift trucks, or the like, at any point of the stock from which the desired product has to be taken. Moreover there is the probability that products of the same quality find themselves in different places and spaced apart from one another and there is no guarantee whatsoever that the product taken away be the one that has been stored the longest.

Further there are other systems known by which products loaded on carriages or simple platform cars or in boxes or the like, are charged at one end of inclined or plane chutes constituted by a succession of loose or driven rollers extending the entire length of the chute and arranged with their axes parallel and transverse with respect to the forwarding direction of conveyance. The products are conveyed either by gravity or by the actuation of said rollers. In other known systems there are provided chains for driving the rollers resting or rolling on special guides. These systems however have various inconveniences. In the cases of inclined chutes with which the carriages or platform cars loaded with the product slide by their own weight from one end to the other end of the chute, the first carriage or platform car at the discharge end is subjected to the weight of all the subsequent carriages or platform cars, which makes its removal extremely difficult. The inclination of the chutes which determines the speed of advance of the carriages or platform cars depends on the friction and on the weight of the carriages and it cannot be calculated accurately and moreover it ought to be variable in accordance with the requirements of the individual case. So it may happen that the carriages or platform cars advance too slowly and even stop or attain excessive speeds, with the resulting consequences. Moreover, if the chutes in question have considerable lengths, the inclination even if slight represents a loss of space in height in the rooms where they are installed.

The systems with controlled feed on the other hand, which may be with driven rollers, directly controlled or dragged by chains, require motive drives of considerable power since said drives must provide the energy for contemporaneously forwarding all of the carriages or platform cars that are on the forwarding line. It should be borne in mind that the products loaded onto a carriage or platform car often may attain great weight. In addition to the forwarding of the carriages or platform cars loaded, the motive drives have to provide the contemporaneous actuation or dragging of all of the rollers forming the forwarding line and the number of which may be considerable especially if the lines are long extending from one end to the other end of a storeroom.

It is an object of the present invention to provide a transporting and storing device that eliminates the inconveniences of the systems known heretofore, making it possible to collect the product of one quality and to furnish an immediate surveillance of the quantities stored, while providing safety that the product removed is that having remained in the storehouse longest, and while confining the platform for loading and discharging the products to restricted zones, thereby saving space and power.

These and other objects are attained according to the invention by a device for transporting and storing products packaged in any manner, but transportable on platform cars or the like, the main distinction of which is constituted by the fact that at the time at which the device ceases its function of transportation it is transformed automatically into a storing device and as soon as the cause making it operate as a storing device ceases, the device automatically resumes its transporting function.

The device according to the invention comprises a pair of parallel and space-apart chains movable in a closed path in vertical planes, and support guides for said chains at least in registry with their upper section, the device being substantially characterized in that said pair of chains carries at least a carriage constituted by two parallel transverse shafts, each of which carries first and second pairs of rollers at its ends between the pair of chains, the first pair of rollers being of smaller diameter and being adapted to slide on the lower portion of said guides of the chains, while the second pair of rollers have a larger diameter and are adapted to cooperate with feet possessing inclined planes as carried by the platform cars which convey the goods to be stored, said guides of the chains being provided with supports for the platform cars when the latter are not acted upon by the second rollers, and at the unloading end of the pair of chains there being provided an abutment adapted to stop the platform cars at the end of their travel.

In the operation of this device, the platform cars with the products to be stored are loaded one at a time by means of suitable lift trucks or the like at one end of the device, and are made to rest on the supports of said guides. On arrival of the first carriage carried by the pair of chains, the four rollers having larger diameter engage the inclined planes of the feet of the platform car thereby supporting its weight and lifting it slightly from the top support of the guides and so relieving its weight on the lower part of said guides to provide finally—when the force of sliding friction, owing to the reduced weight of the platform car on the guides, has become smaller in value than the rolling friction of the rollers and shafts of the carriage—advancement of the platform car in the forwarding direction of the pair of chains. During the transportation, the platform car rests by means of its feet on the four rollers having larger diameter, of a carriage that in turn runs on the lower portion of the guides by means of the four rollers having smaller diameter, as dragged by the chains. As soon as the platform car meets said abutment or another platform car previously at rest, the transporting carriage leaves the platform car, being pulled forward by the chains, and deposits said platform car on the top support of the guides. In that way it is possible for a plurality of loaded platform cars to be stored behind one another. When the first platform car stopped by said abutment is removed, the following platform car is automatically fed forward until abutting against the abutment and the other platform cars gradually follow. There are contemporaneously forwarded only as many platform cars as are acted upon by the transporting carriages.

During the stay of the platform cars, if the chains are in movement each time a carriage passes under a standstill platform car, the latter is slightly lifted by the rollers having larger diameter, without being transported forward, the forward movement being prevented by the abutment or stationary platform car ahead, to be then redeposited on the supports of the lateral guides Due to the small inclination (of the order of magnitude of 3 to 4%) of the planes of the small feet of the platform cars cooperating with the respective rollers of the carriage, said lifting and re-lowering of the platform cars is not only of small magnitude but also takes place very softly, when it does not cause any disturbance. On the other hand it is possible, of course, to drive the chains only at the time at which it is necessary to carry forward some platform cars, thereby limiting the vibrations of the stored platform cars.

By the transporting and storing device according to the invention it is possible by a minimal expenditure of power to handle considerable weights with maximum ease.

In a particularly advantageous embodiment of the small feet of the platform car each small foot possesses in its longitudinal direction parallel to the direction of chain advance, at least one front inclined plane and at least a respective rear inclined plane with an inclination opposed to the first plane. This particular configuration of the small feet of the platform cars, coupled with the function of the small rollers of the transporting carriages cooperating with said small feet, provides the important advantage that the platform cars loaded with products are stored at a certain spacing from on another, while the first car is spaced from the abutment. In that way, not only can the first platform car of the accumulated row be removed frontwards by meanns of a lift truck or the like, but also lateral removal of any platform car is made possible, even if the latter finds itself in the middle of the row. To permit the access to the fork of the lift trucks, both from the front and from the side of the platform cars, the small feet have special front and side slots.

Another characteristic of the small feet of the platform cars as provided according to the invention consists in that their external sides can be conveniently chamfered to cooperate with the supports of the guides in order to ensure the centering of the platform cars with respect to the guides when said platform cars are deposited thereon.

A further advantageous characteristic of said small feet is that they have a symmetrical shape with respect to their longitudinal vertical medial plane as well as with respect to the transverse plane, so as to permit the rotation of each foot around itself or the reversal between the right-hand foot and the left-hand foot on the platform car in order to double the wear resistance and to fully utilize the material mostly subject to deterioration.

Moreover each small foot may have its inclined planes recessed between two lateral downwardly projecting parts serving as a support for the platform car during the loading and unloading operation.

In a warehouse, there may be provided, obviously, a plurality of transporting and storing devices as above described, one near to the other one with convenient passageways between groups of devices side by side, and in different planes according to the capacity of the storage area.

The invention will now be described in greater detail with reference to the accompanying drawings showing an embodiment given without limitation.

FIGURES 3 and 4 are partial cross-sections of the device in two distinct stages of operation;

FIGURES 5 and 6 are respectively a front view and a side view of a platform car; and FIGURES 7 and 8 are respectively a side view and a partial cross-section along line VIII—VIII of FIG. 7, of a store diagrammatically represented with a plurality of devices arranged side by side and in a number of planes.

Figure 1:
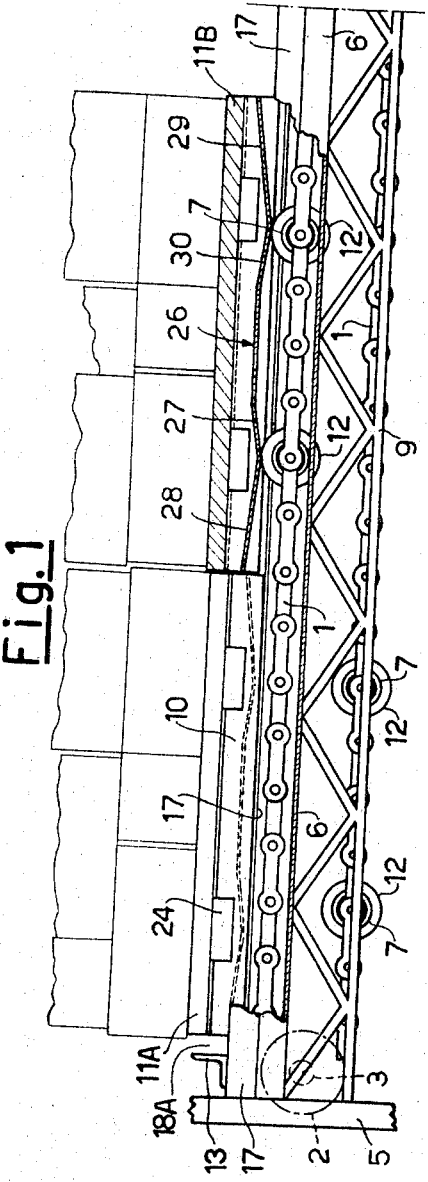
FIGURES 1 and 2 illustrate diagrammatically the device in side view in two distinct stages of operation.
Figure 2:
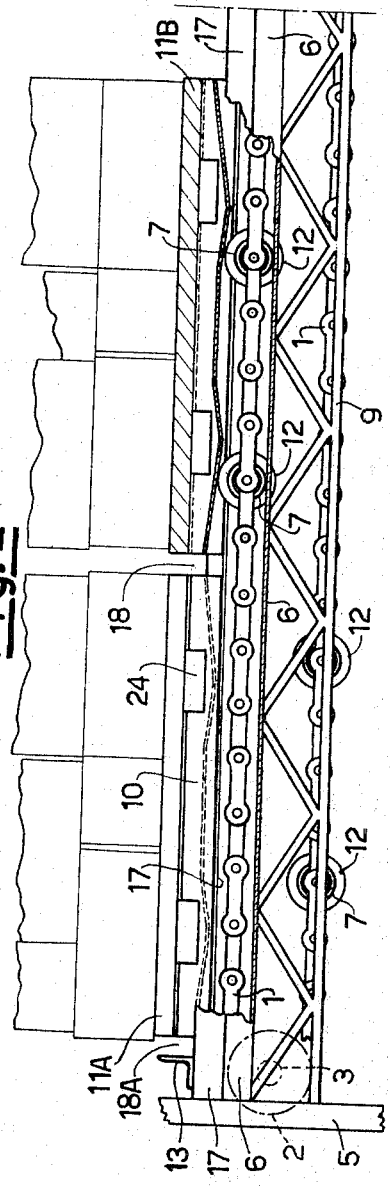

With reference particularly to FIGURES 1 to 4, the device according to the invention comprises a pair of chains 1 (only one of which chains is illustrated in the drawings), each being wound on two wheels 2 (in FIGURES 1 and 2 there is illustrated only one end with a wheel 2 for one of the chains 1). The chains 1 are parallel and spaced apart and they are movable in vertical planes. At one end of the chains, the wheels 2 are fixed on a common shaft 3 that is rotated by any motive drive so as to impart to the chains 1 a movement with uniform speed conveniently calculated. The two wheels are idle at their other end on a second shaft which also is idling (not illustrated). The horizontal upper branch of pair of chains is guided and rests on guide member 6 rigid with upright 5 to which are fixed slideways 9 for the lower branch of the pair of chains 1.

The pair of chains carries at least one transporting carriage constituted by two parallel transverse shafts 8 fitted with their ends 4 in the holes of the links of the chains 1.

In registry with each end of each shaft 8, at the interior of the chains 1, there are provided loosely two rollers 7 and 12 respectively. The pair of external rollers 7 on each shaft 8 has a smaller diameter and is adapted to slide, in the upper branch, on the horizontal part of the guide members 6 (see particularly FIGURES 3 and 4), while in the lower branch—the slideways 9 being less wide—the links of the chains 1 slide directly on said slideways (this lower branch with the guideways 9 is not illustrated in FIGS. 3 and 4).

The pair of internal rollers 12 are of large diameter and are arranged in such way as not to interfere with the horizontal parts of the members 6.

Rigidly secured at the upper end of members 6 are supporting profiles 17 having a T-shaped cross-section and arranged with their central cores in a horizontal position so as to provide a support for the small feet 10 of the platform cars 11.

Each small foot 10 possesses at its bottom a recess portion 26 bounded by a pair of inclined planes 27, 28 and 29, 30 with opposed inclination and by a substantially plane intermediate portion.

The portion 26 cooperates with the rollers 12 of the carriages and the center distance between the two shafts 8 of each carriage is equal to the distance between the tips formed by each pair of inclined planes 27, 28 and 29, 30.

The operation of the device is as follows. The platform cars 11 are loaded at one end of the device and are made to rest one at a time on the supporting guides 17. On arrival of the first carriage carried by the pair of chains 1 there passes firstly the front pair of rollers 12 under the rear pair of inclined planes 27 and 29 of the small feet 10, gradually lifting the car 11 from the rear portion without displacing it and re-depositing it again on the guides 17. A little afterwards both pairs of rollers 12 engage the two rear inclined planes 27 and 29 respectively. The force of traction of the chains is decomposed into two components, a vertical one and a horizontal one. The vertical component has the effect of lightening the platform car resting on the guides 17. The weight of the platform car is transferred uniformly through the small rollers 12, the shafts 8 and the small rollers 7 onto the horizontal portion of the guide members 6. The horizontal component of the force of traction serves to advance the platform car 11 as soon as the force of sliding friction between the platform car and the guides 17 has become—by effect of the aforesaid lightening—a value lower than the rolling friction of the small rollers 12 and 7 of the pair of shafts 8.

The inclination of the rear inclined planes 27, 29 of the path 26 is the same as that of the front inclined planes 28, 30 and is of the order of magnitude of 3 to 4%. This fact makes it possible for the platform cars to be driven by the transport device from one side or the other.

In FIGURES 1 and 2 there are illustrated two platform cars 11A and 11B loaded with products (diagrammatically represented in the shape of boxes).

FIGURE 1 illustrated the transport stage of a platform car 11B, namely the time at which said platform car, being slightly lifted by the rollers 12 of a carriage, stops against another platform car 11A already previously forwarded as far as an end-of-stroke abutment 13. The small feet of the platform car 11B are shown in longitudinal section to show the recess 26 with the inclined planes which at this time are acted upon by the rollers 12 whereby the whole platform car is lifted to its maximum height in the supporting guides 17.

FIGURE 2 illustrates the position at a time immediately following that illustrated in FIGURE 1, in which the rollers 12 have passed beyond the tips of the inclined planes 27, 28 and 29, 30 of the small feet 10. At this time the platform car 11B is no longer retained in lifted position and can fall back into the supporting guides 17. During this fall, the small feet 10 are braked by the front inclined planes 28 and 30 (referring to the forwarding direction of the platform cars) and, therefore, lowering is effected in a comparatively slow manner. Moreover, the platform 11B moves rearwards a small distance thereby spacing itself apart from the front platform car 11A. In FIGURE 2 the free space that is created between the two platform cars 11A and 11B is indicated by 18. An analogous free space 18A had already previously been formed between the abutment 13 and the platform 11A.

As can be seen, the platform cars accumulating in a row are not in contact with one another, but at a certain distance from one another. Hence it is possible to remove the accumulated platform cars, for instance by means of a lift truck; not only frontally, namely always the first one that stops in register with the abutment 13, but also laterally. This possibility is particularly desirable in the case in which a transporting and storing line of platform cars is not exclusively utilized for one single type of product but for two or more types conveniently distinguished.

The lateral removal of the platform cars is rendered possible not only by the aforesaid spacing of the successive platform cars but also by the fact that each platform car is laterally equipped with suitable gripping means for the loading and unloading members. In particular, the small feet 10 of the platforms 11 are equipped with lateral slots 24 (see FIGURES 1, 2 and 6) into which the fork of a lift truck can penetrate.

With reference particularly to FIGURES 3 to 6, therein is shown how each small feet 10 is constituted, according to the instant invention, by a shaped element, for instance of sheet metal or plastics. Said shaped element is secured, for instance by screwing, onto the lower face of the platform car 11 in longitudinal direction and as clearly visible in the drawings, possesses a shape symmetrical with respect both to its longitudinal medial plane and to its transversal medial plane. On each platform car 11 there are fixed two shaped elements 10A and 10B (FIGURE 5) along axes 21A and 21B respectively, the distance X between these axes being equal to the distance between the middle lines of the slots 24 provided in the side walls of each shaped element. At their two ends the shaped elements 10 are open and these openings 25 serve for the frontal entrance of the fork of the lift trucks.

The side walls of the shaped elements are chamfered in register with their lower borders, as indicated at 22 in FIGURES 3 and 4, and this chamfering serves to center the platform cars 11 with respect to the guides 17. In fact during the forwarding movement, namely, when the platform car 11 is lifted by the rollers 12 from the supporting guides 17 (see FIGURE 4), the said platform car may slightly displace itself laterally until the chamfer 22 of the small foot 10 comes to bear against the upper border 19 of the respective guide 17. When the platform car is then re-deposited upon the supporting guides 17, its chamfer 22, at the side towards which the platform car had shifted during transport, comes to slide on the border 19 of the respective guide 17 and the platform is brought back to its centered position in which it deposits itself upon the supporting guides, as visible in FIGURE 3, with the chamfer 22 in contact with the border 19.

In FIGURES 3 and 4 there is also visible the lower portion 6 of the guides on which rolls the small roller 7 which is arranged loosely on the shaft 8 of the transporting carriage. Moreover, it can be seen how the roller 12 having a larger diameter acts in the zone 20 of the recess 26 to the left of the longitudinal axis of symmetry 21 of the shaped element 10. The entire recess 26 is formed between two projecting lateral parts 23 with horizontal supporting planes that support the platform car upon the guides 17 and on ground during loading and unloading.

These projecting lateral parts 23 protect the recess 26 from entry of dust or other extraneous matter.

The symmetrical shape of each small foot 10 permits the replacement of the foot 10A by the foot 10B of a platform car (see FIGURE 5) or the rotation by 180° of the small feet around their center. If such a reversal or rotation of the feet 10 is effected, the zones that were formerly subjected to wear (chamfer 22 at contact with the border 19 and zone 20 of the recess 26 at contact with the roller 12) are put out of use and there are instead utilized new corresponding zones which are intact, thereby attaining the purpose of doubling the longevity of the shaped element.

Another important consequence coming from the perfect symmetry of the shaped elements forming the small feet of the platform cars is that the latter can be transported, as already mentioned, in one direction or the other parallel to their longitudinal axis. So, if it is desired to reverse, for instance, the direction of forwarding of the platform cars and to accumulate them starting from the opposed end of the store-room, it suffices to reverse the drive of the pair of chains 1 and to provide, of course, an abutment analogous to the abutment 13 in registery with the opposed end of the guides 17.

During the stay of the platform cars resting on the guides 17, as illustrated in FIGURE 2, and if the chains 1 are in movement, each time a carriage passes under a standstill platform car, the latter is slightly lifted by the rollers 12 without being transported forward, the forwarding movement being prevented by the abutment 13 or by another stationary platform car ahead, and then re-deposited upon the guides 17. When the first stationary platform car of the row or an intermediate platform car is removed, the following platform car is automatically transported forward (if the chains 1 are in movement) as far as the abutment 13 or as far as the next stationary platform car, by the first arriving carriage and gradually also the other platform cars follow that are stored. It is apparent that it is possible to provide suitable controls for putting the device in operation, that is to say for driving the chains 1, each time an operation is necessary, while in the rest stage, if there is neither a loading nor a removal of platform cars, the chains 1 can be stopped.

Figure 7:
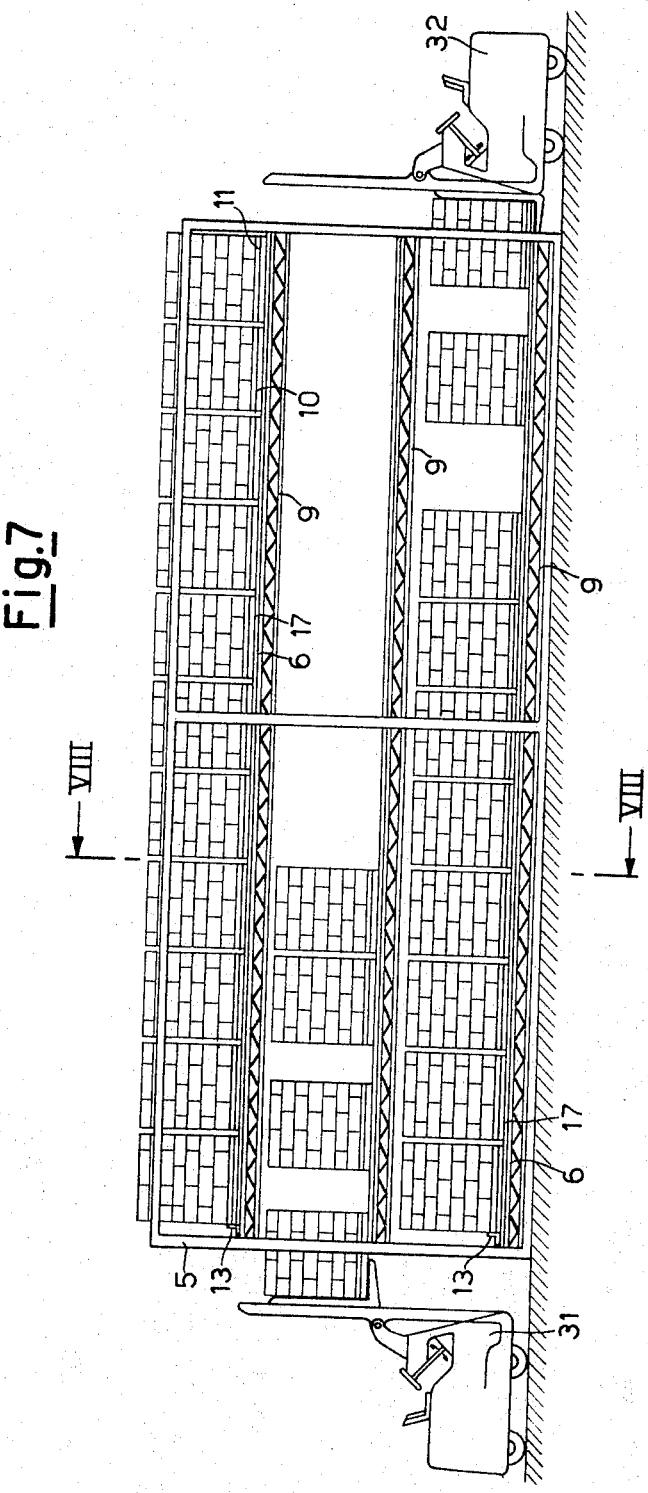

FIGURES 7 and 8 diagramatically illustrate a portion of a store-room comprising four transporting and storing devices of the type described arranged side by side in each one of three superimposed planes.

At the left end of FIGURE 7 there is illustrated a lift truck 31 suited for the removal of the platform cars 11, while at the right end there is illustrated an analogous lift truck 32 destined for loading. Of course, in a storeroom there may be provided as many transporting and storing devices as can be used therein and there will be conveniently provided passageways between groups of devices arranged side by side so as to permit access also from the side if required.

I claim:

1. A transporting and storing device for products transportable on platform cars, comprising a pair of parallel chains, spaced apart and movable in a closed path in vertical planes between a loading and an unloading end, at least one carriage supported by said pair of chains for transport therewith, said carriage including two parallel transverse shafts, a first pair of rollers on each shaft between the pairs of chains, guide means for guidably supporting said rollers, a second pair of rollers on said shaft between the first said pair, said rollers of the second pair having a larger diameter than those of the first pair, means on each platform car defining feet bounded by inclined planes for being engaged by the second pair of rollers of the traveling chains such that the platform car is lifted and advanced, said guide means including guide supports for feet of the platform cars when the latter are not raised by the second pair of rollers, and abutment means at the unloading end of the pair of chains for stopping the platform cars at the end of their advance.

2. A device according to claim 1 wherein said feet of the platform cars are constituted by shaped elements, said inclined planes being constituted as at least one front inclined plane and at least one respective rear inclined plane with opposed inclination.

3. A device according to claim 2 wherein each shaped element has an external chamfered surface at its lower edge for cooperating with the respective guide support.

4. A device according to claim 2 comprising lateral gripping means on each platform car for the loading and unloading of the platform cars.

5. A device according to claim 4 wherein said gripping means are constituted by slots in the shaped elements forming the feet of the platform cars.

6. A device according to claim 5 wherein said feet are arranged in pairs at opposite sides of each platform car, said feet in each pair having a determinable lateral spacing, said slots also being arranged in pairs at opposite sides of each platform car and having the same lateral spacing as the feet, said feet having open ends for the engagement therein of a device for unloading the feet and platform car therewith from the carriage.

7. A device according to claim 2 wherein said shaped elements forming the feet have a shape symmetrical with respect to both their longitudinal middle plane and their transversal middle plane.

8. A device according to claim 2 wherein the shaped elements include two downwardly projecting portions disposed laterally of said inclined planes for resting on the guide supports, the inclined planes of the shaped elements being recessed between said downwardly projecting portions.

No references cited.

ARTHUR L. LA POINT, *Primary Examiner.*

D. F. WORTH, *Assistant Examiner.*